US010747484B2

(12) United States Patent
Tajima

(10) Patent No.: US 10,747,484 B2
(45) Date of Patent: Aug. 18, 2020

(54) COMMUNICATION CONTROL SYSTEM, IMAGE PROCESSING UNIT, ROUTER, COMMUNICATION RELAY DEVICE AND NON-TRANSITORY RECORDING MEDIUM

(71) Applicant: Konica Minolta, Inc., Chiyoda-ku, Tokyo (JP)

(72) Inventor: Hiroki Tajima, Itami (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/030,285

(22) Filed: Jul. 9, 2018

(65) Prior Publication Data

US 2019/0050174 A1 Feb. 14, 2019

(30) Foreign Application Priority Data

Aug. 8, 2017 (JP) ................. 2017-152975

(51) Int. Cl.
  *G06F 3/12* (2006.01)
  *H04L 12/823* (2013.01)
  *H04L 12/741* (2013.01)
  *H04L 12/18* (2006.01)
  (Continued)

(52) U.S. Cl.
  CPC .......... *G06F 3/1231* (2013.01); *G06F 3/1222* (2013.01); *G06F 3/1236* (2013.01); *G06F 3/1238* (2013.01); *H04L 12/18* (2013.01); *H04L 12/1886* (2013.01); *H04L 12/66* (2013.01); *H04L 45/74* (2013.01); *H04L 47/32* (2013.01)

(58) Field of Classification Search
  CPC ......... H04L 12/18; H04L 12/66; H04L 45/26; H04L 45/74; H04L 47/32; H04L 47/323; H04L 61/1541; H04L 63/0236; H04L 67/16; H04L 67/1061; H04L 67/18; H04L 29/08648; H04L 29/12113; H04W 8/005; G06F 3/1226; G06F 3/1231; G06F 3/1236; G06F 3/1238
  USPC ................................. 358/1.11–1.18
  See application file for complete search history.

(56) References Cited

U.S. PATENT DOCUMENTS

2005/0053016 A1\* 3/2005 Kawai ................ H04L 41/046
  370/254
2005/0216602 A1\* 9/2005 Armstrong ........ H04L 29/12113
  709/250

(Continued)

FOREIGN PATENT DOCUMENTS

JP 2004-5553 A 1/2004

*Primary Examiner* — Chad Dickerson
(74) *Attorney, Agent, or Firm* — Squire Patton Boggs (US) LLP

(57) ABSTRACT

A communication control system comprises: a router that connects a first network and a second network; a communication relay device that connects the first network and the second network; and a hardware processor that: determines whether a first packet received from the first network is a packet to be discarded by the router; transmits a second packet corresponding to the first packet to the second network when the first packet is determined as the packet to be discarded by the router; and rewrites a transmitter IP address of a response packet corresponding to the second packet to an IP address of the router and sends the response packet to the first network when the response packet is received from the second network.

14 Claims, 10 Drawing Sheets

(51) Int. Cl.
*H04L 12/66* (2006.01)
*H04N 1/00* (2006.01)

(56) References Cited

U.S. PATENT DOCUMENTS

| | | | | |
|---|---|---|---|---|
| 2007/0183418 | A1* | 8/2007 | Riddoch | H04L 12/18 370/389 |
| 2008/0123551 | A1* | 5/2008 | Hanes | H04L 29/12028 370/254 |
| 2009/0125739 | A1* | 5/2009 | Satoh | G06F 1/3209 713/322 |
| 2011/0280175 | A1* | 11/2011 | Yamada | H04W 84/105 370/315 |
| 2017/0063706 | A1* | 3/2017 | Suzuki | H04L 47/32 |
| 2018/0103092 | A1* | 4/2018 | Watanabe | H04W 76/25 |

* cited by examiner

COMMUNICATION CONTROL SYSTEM, IMAGE PROCESSING UNIT, ROUTER, COMMUNICATION RELAY DEVICE AND NON-TRANSITORY RECORDING MEDIUM

Japanese patent application No. 2017-152975 filed on Aug. 8, 2017 including description, claims, drawings, and abstract the entire disclosure is incorporated herein by reference in its entirety.

BACKGROUND

Technological Field

The present invention relates to a communication control system, an image processing unit, a router, a communication relay device and a non-transitory recording medium. The present invention more specifically relates to a technique that enables a retrieval of a device connected to a second network from a first network.

Description of the Related Art

In a network system that includes a first network and a second network connected to each other via a router, an information processing device on the first network may broadcast or transmit by multicast a command to retrieve a device such as a printer. The router blocks the broadcast packet and/or the multicast packet so that the command sent from the first network does not transmitted to the second network. The information processing device connected to the first network is not allowed to detect the device connected to the second network.

In order to prevent this, conventional probe devices are installed on the second network. The information processing device connected to the first network performs unicast transmission to transmit the command to the probe device, and the command passes through the router. The command is then delivered to the second network. This known technique is introduced for example in Japanese Patent Application Laid-Open No. JP 2004-5553 A. According to the known technique, in response to receiving the command from the first network, the probe device broadcasts the command to the second network. The device connected to the second network receives the broadcast command, and transmits a response packet to the probe device. The probe device performs unicast transmission to transmit the response packet collected from the device on the second network to the information processing device on the first network. As a result, the information processing device on the first network may detect the device connected to the second network.

According to the aforementioned known technique, it is required to transmit a unicast packet which specifies an IP address of the probe device as a destination when the information processing device connected to the first network retrieves the device connected to the second network. For performing a printer retrieval at a start of a printer driver, for example, advance registration of the IP address of the probe device with the printer driver is required. This makes a user bothersome. Recently, larger-scaled network has been installed in places such as an office, for instance. Multiple networks are connected to each other via the router. In order to enable the printer retrieval to retrieve all of the printers connected to the multiple networks, all of the IP addresses of the respective probe devices installed on the respective network need to be registered with the printer driver, resulting in large operation load.

SUMMARY

The present invention is intended to solve the above problems. Thus, the present invention is intended to provide a communication control system, an image processing unit, a router, a communication relay device and a non-transitory recording medium capable of obtaining a response packet corresponding to a broadcast packet and/or a multicast packet without any advance setting with a printer driver of an information processing device.

First, the present invention is directed to a communication control system.

To achieve at least one of the abovementioned objects, according to an aspect of the present invention, the communication control system reflecting one aspect of the present invention comprises: a router that connects a first network and a second network; a communication relay device that connects the first network and the second network; and a hardware processor that: determines whether a first packet received from the first network is a packet to be discarded by the router; transmits a second packet corresponding to the first packet to the second network when the first packet is determined as the packet to be discarded by the router; and rewrites a transmitter IP address of a response packet corresponding to the second packet to an IP address of the router and sends the response packet to the first network when the response packet is received from the second network.

Second, the present invention is directed to an image processing unit having a single housing.

To achieve at least one of the abovementioned objects, according to an aspect of the present invention, the image processing unit reflecting one aspect of the present invention has the single housing including: a communication control system according to claim 1; a second network; and an image forming device connected to the second network and being capable of producing printed outputs.

Third, the present invention is directed to a router that connects a first network and a second network.

To achieve at least one of the abovementioned objects, according to an aspect of the present invention, the router reflecting one aspect of the present invention comprises a hardware processor that: sends a predetermined packet to the second network when the predetermined packet to be sent to the second network is received from the first network, and discards a packet when the packet different from the predetermined packet is received from the first network; obtains a packet to be sent to the first network from a communication relay device which is connected between the first network and the second network prior to the transmission to the first network; and rewrites a transmitter IP address of the packet to an IP address of the router and sends to the first network when the packet sent from the communication relay device is obtained.

Fourth, the present invention is directed to a communication relay device connected in parallel with a router connecting a first network and a second network.

To achieve at least one of the abovementioned objects, according to an aspect of the present invention, the communication relay device reflecting one aspect of the present invention comprises a hardware processor that: determines whether a first packet received from the first network is a packet to be discarded by the router; transmits a second packet corresponding to the first packet to the second network when the first packet is determined to be the packet discarded by the router; and rewrites a transmitter IP address of a response packet corresponding to the second packet to an IP address of the router and sends the response packet to the first network when the response packet is received from the second network.

Fifth, the present invention is directed to a non-transitory recording medium storing a computer readable program to be executed by a computer connecting a first network and a second network.

To achieve at least one of the abovementioned objects, according to an aspect of the present invention, the non-transitory recording medium reflecting one aspect of the present invention stores the computer readable program, execution of the computer readable program by the computer causing the computer to serve as: a router that connects a first network and a second network; and a communication relay device that connects the first network and the second network, execution of the computer readable program by the computer causing the computer to perform: determining whether a first packet received from the first network is a packet to be discarded by the router; transmitting a second packet corresponding to the first packet to the second network when the first packet is determined to be the packet discarded by the router; and rewriting a transmitter IP address of a response packet corresponding to the second packet to an IP address of the router and sending the response packet to the first network when the response packet is received from the second network.

Sixth, the present invention is directed to a non-transitory recording medium storing a computer readable program to be executed by a computer of a router connecting a first network and a second network.

To achieve at least one of the abovementioned objects, the non-transitory recording medium reflecting one aspect of the present invention stores the computer readable program, execution of computer readable program by the computer of the router causing the computer of the router to perform: sending a predetermined packet to the second network when the predetermined packet to be sent to the second network is received from the first network, and discarding a packet when the packet different from the predetermined packet is received from the first network; obtaining a packet to be sent to the first network from a communication relay device which is connected between the first network and the second network prior to the transmission to the first network; and rewriting a transmitter IP address of the packet to an IP address of the router and sending to the first network when the packet sent from the communication relay device is obtained.

Seventh, the present invention is directed to a non-transitory recording medium storing a computer readable program to be executed by a computer of a communication relay device connected in parallel with a router connecting a first network and a second network.

To achieve at least one of the abovementioned objects, the non-transitory recording medium reflecting one aspect of the present invention stores the computer readable program, execution of computer readable program by the computer of the communication relay device causing the computer of the communication relay device to perform: determining whether a first packet received from the first network is a packet to be discarded by the router; transmitting a second packet corresponding the first packet to the second network when the first packet is determined to be the packet discarded by the router; and rewriting a transmitter IP address of a response packet corresponding to the second packet to an IP address of the router and sending the response packet to the first network when the response packet is received from the second network.

BRIEF DESCRIPTION OF THE DRAWING

The advantages and features provided by one or more embodiments of the invention will become more fully understood from the detailed description given herein below and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

First Preferred Embodiment

Figure 1:
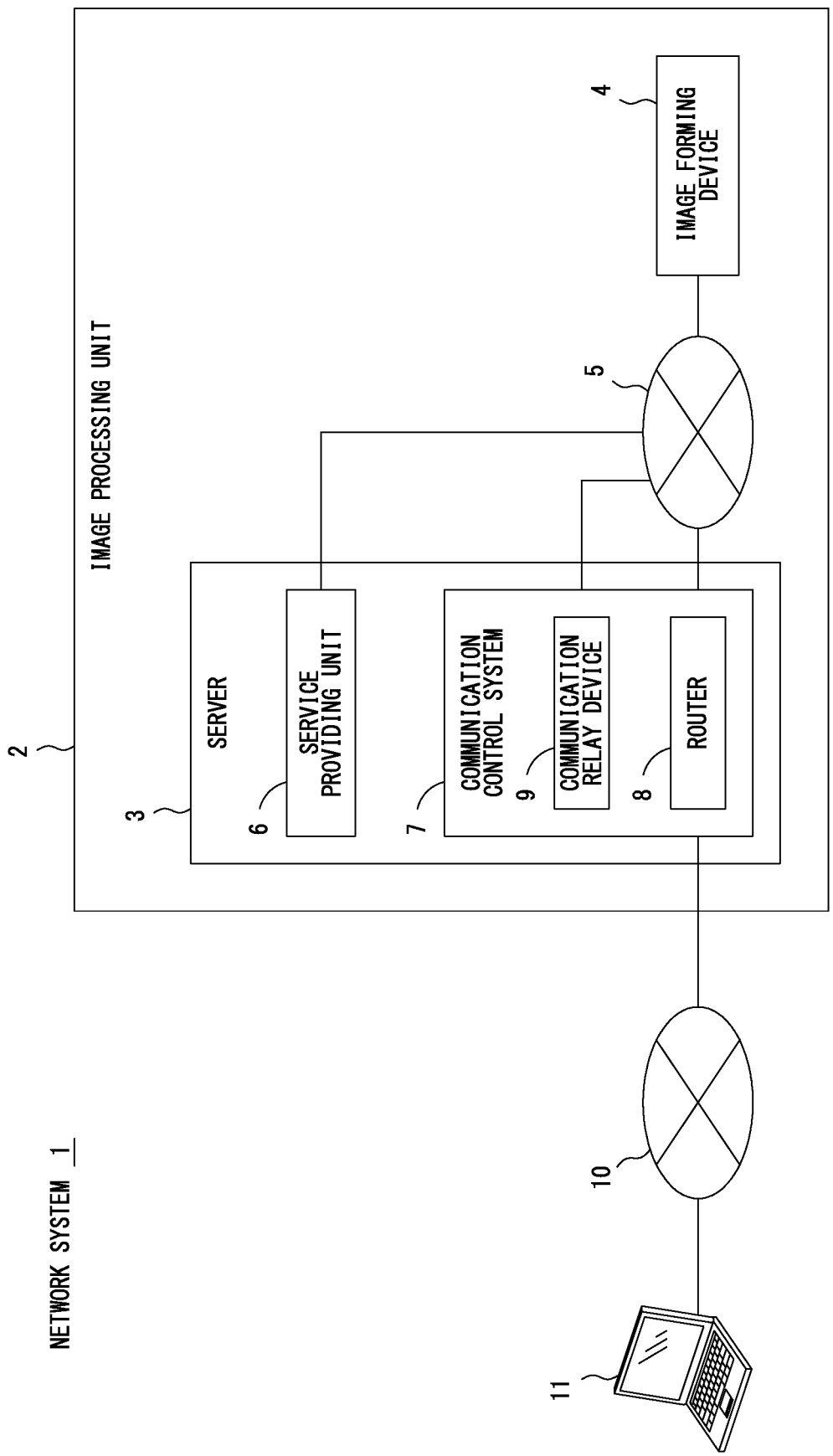
FIG. 1 illustrates an exemplary configuration of a network system.

FIG. 1 illustrates an exemplary configuration of a network system 1 in which the first preferred embodiment of the present invention may be practiced. The network system 1 includes an image processing unit 2. The image processing unit 2 is connected to a company network (a first network) 10 such as company LAN (Local Area Network). An information processing device 11 such as a personal computer (PC) used by a user is connected to the company network 10. An IP address corresponding to a network address assigned to the company network 10 by a person such as a network administrator of an office, for instance, is set to the information processing device 11. The information processing device 11 does not always have to be the PC. It may be a portable communication terminal such as a tablet terminal or a smartphone. In the example of FIG. 1, the single information processing device 11 is connected to the company network 10. The number of the information processing device 11 does not have to be one. The multiple information processing devices 11 may be connected to the company network 10. The company network 10 may be a complex network that includes multiple networks connected to each other.

An application such as a printer driver that may construct a print job that may be processed by an image forming device 4 in the image processing unit 2, for instance, is installed on the information processing device 11 connected to the company network 10. Once the application is started on the information processing device 11, the application broadcasts or performs multicast to transmit a retrieval command to retrieve a printer to the company network 10. By obtaining a response packet to the retrieval command, the information processing device 11 detects the printer to which the print job may be transmitted.

A server 3 and the image forming device 4 are incorporated in a single housing as the image processing unit 2. The server 3 and the image forming device 4 may make communication with each other over an internal network 5. The internal network 5 is different from the company network 10. More specifically, the company network 10 and the internal network 5 have different respective network address. The internal network 5 may be a virtual network constructed by software by the server 3, for example.

The image forming device 4 may be one of MFPs (Multifunction Peripherals) including multiple functions such as a scan function, a print function, and/or a fax function, for instance. The image forming device 4 may process a job specified by a user and/or a job received over the internal network 5. However, this is given not for limitation. The image forming device 4 may be the printer that only includes the print function. The IP address corresponding to the network address of the internal network 5 is set in advance to the image forming device 4.

The server 3 is formed from a computer, for example, and includes a function to connect the company network 10 and the internal network 5. The server 3 also includes a function to provide the information processing device 11 installed on the company network 10 with a variety of services. To be more in detail, the server 3 includes a computer such as a hardware processor like a CPU and a computer readable recording medium like a memory, which are not illustrated in FIG. 1. The hardware processor reads and executes a program stored in advance in the recording medium so that the server 3 may serve as a service providing unit 6 and a communication control system 7.

The service providing unit 6 is connected to the internal network 5. The service providing unit 6 provides the information processing device 11 connected to the company network 10 with the variety of services via the internal network 5. The server 3 serves as a web server, for example, so that the service providing unit 6 is realized. The services provided by the service providing unit 6 may include a document management service, a TV conference service and/or an electronic conference service, for example. The service besides the aforementioned services may be provided by the service providing unit 6. The IP address corresponding to the network address of the internal network 5, which is different from the IP address of the image forming device 4, is assigned to the service providing unit 6.

The communication control system 7 connects the company network 10 and the internal network 5. The communication control system 7 includes a router 8 and a communication relay device 9. Each of the router 8 and the communication relay device 9 is installed between the company network 10 and the internal network 5.

The router 8 connects the separate networks, the company network 10 and the internal network 5, to each other. More specifically, the router 8 sends the packet received from the company network 10 to the internal network 5 or sends the packet received from the internal network 5 to the company network 10. The broadcast packet or the multicast packet for retrieving the printer may be received from the information processing device 11 connected to the company network 10. In this case, the router 8 discards the received packet and does not send to the internal network 5. With such router 8's function, a traffic amount of the internal network 5 may be reduced.

When the packet is received from the company network 10, the communication relay device 9 determines if the received packet is a packet to be discarded by the router 8. If the packet is to be discarded by the router 8, the communication relay device 9 transmits the packet to the internal network 5. A broadcast retrieval command or a multicast retrieval command for retrieving the printer transmitted from the information processing device 11 may be delivered to the image forming device 4 via the communication relay device 9. The image forming device 4 then generates a response packet to the search command and transmits the response packet to the communication relay device 9. In response to receiving the response packet from the image forming device 4, the communication relay device 9 sends the response packet to the company network 10. As described above, the information processing device 11 may receive the response packet sent from the image forming device 4 in response to the retrieval command, and detect the image forming device 4 as the printer to which the print job may be transmitted.

For using the service provided by the service providing unit 6 of the server 3, the information processing device 11 accesses the service providing unit 6 connected to the internal network 5 via the router 8. To be more specific, the information processing device 11 registers in advance an IP address of the router 8 as an IP address for using the service provided by the service providing unit 6. When using the service provided by the service providing unit 6, the information processing device 11 transmits a unicast packet to the IP address of the router 8. The unicast packet is transmitted to the internal network 5 with an IP forwarding function of the router 8. The service providing unit 6 is capable of receiving the unicast packet forwarded by the router 8 to the internal network 5, and providing the service in response to a request from the information processing device 11.

As described above, when the communication relay device 9 forwards the response packet from the image forming device 4 as it is to the information processing device 11, the information processing device 11 registers the IP address of the communication relay device 9 as the IP address for transmitting the print job to the image forming device 4. The user of the information processing device 11 is then required to be conscious of the separate IP address for the use of the print function of the image processing unit 2 and the one for the use of the service provided by the service providing unit 6, resulting in reduced usability for the user. From a user's point of view, the image processing unit 2 is formed from the single housing. Thus, if the same IP address is used for the access to the image processing unit 2 even for both of the use of the print function and the use of the service provided by the service providing unit 6, resulting in enhanced convenience.

In the communication control system 7 in which the first preferred embodiment may be practiced, when the communication relay device 9 receives the response packet from the image forming device 4, an address converting function of the router 8 is used to convert a transmitter IP address of the response packet sent from the communication relay device 9 to the company network 10 to the IP address of the router 8. The detailed structure and operation of the communication control system 7 of the first preferred embodiment are described next.

Figure 2:
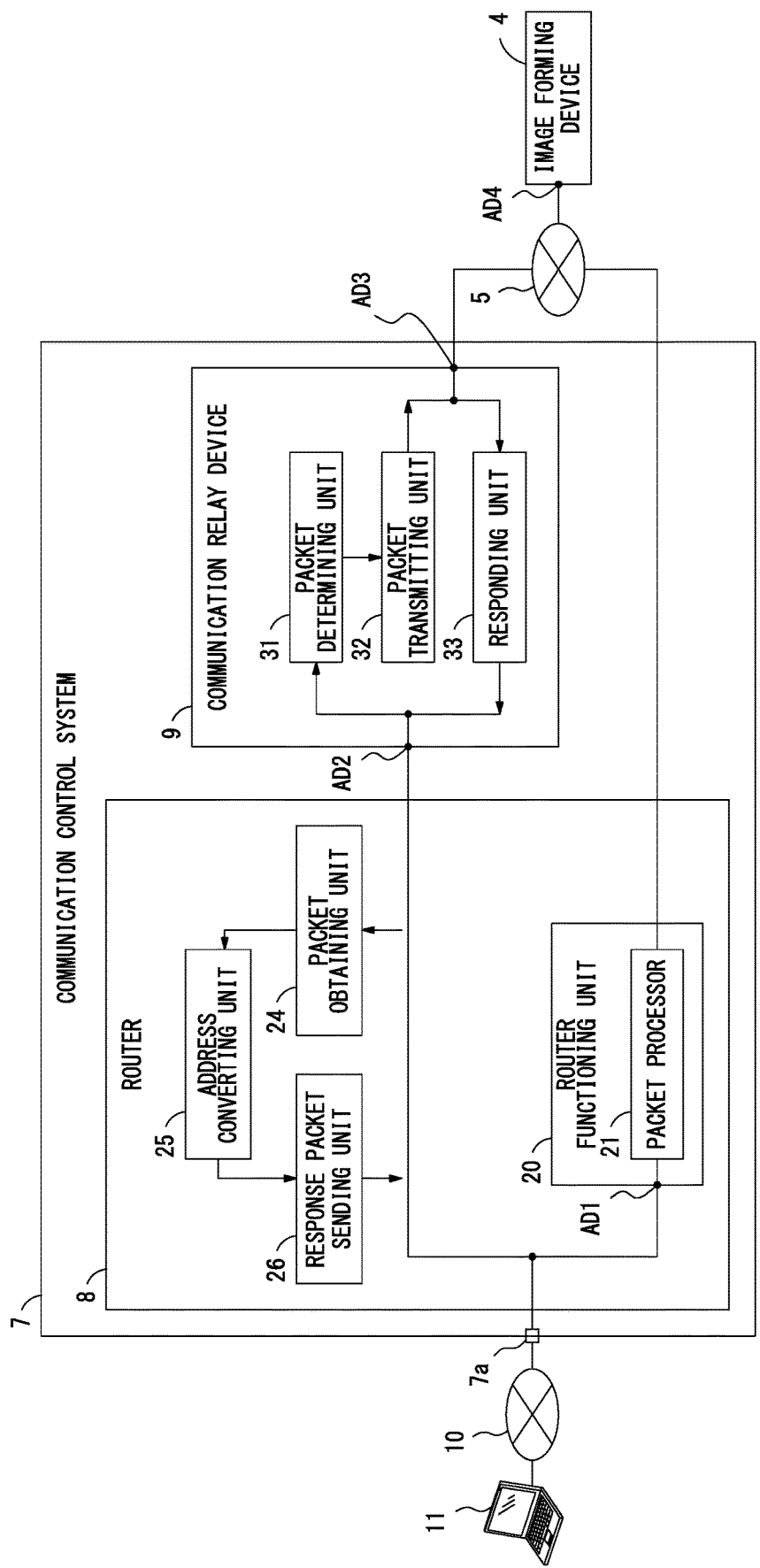
FIG. 2 illustrates a block diagram showing an example of a detailed functional structure of a communication control system in which a first preferred embodiment may be practiced.

FIG. 2 illustrates a block diagram showing an example of a detailed functional structure of the communication control system 7 in which the first preferred embodiment may be practiced. As illustrated in FIG. 2, the communication control system 7 includes a single network port 7a to which a LAN cable that is connected to the company network 10 is connected. The network port 7a serves as a single port that connects the image processing unit 2 to the company network 10. The image processing unit 2 communicates with the information processing device 11, which is connected to the company network 10, via the single network port 7a.

The router 8 is connected to the network port 7a which is connected to the company network 10. Two lines are branched from a transmission line connected to the network port 7a inside the router 8. The router 8 includes a router functioning unit 20, a packet obtaining unit 24, an address converting unit 25 and a response packet sending unit 26. The router 8 connects one of the two lines branched from the network port 7a to the router functioning unit 20. The router functioning unit 20 has the port connected to the company network 10 with the IP address (AD1) corresponding to the network address of the company network 10 being assigned. The router 8 bridge-connects another one of the two lines branched from the network port 7a to the communication relay device 9. The communication relay device 9 has the port bridge-connected to the company network 10 with the IP address (AD2) corresponding to the network address of the company network 10 being assigned. With this above-described connection manner, the communication control system 7 may enable each of the router functioning unit 20 and the communication relay device 9 to receive the respective packet sent from the information processing device 11 to the company network 10.

The router functioning unit 20 includes a packet processor 21. The packet processor 21 determines whether or not the packet received from the company network 10 is the packet that should be forwarded to the internal network 5. The packet processor 21 may receive the broadcast packet or the multicast packet that is sent from the information processing device 11 to retrieve the printer, for example. In such a case, the packet processor 21 discards the packet and does not send to the internal network 5. On the other hand, the packet processor 21 may receive the unicast packet to use the print function of the image forming device 4 and/or the unicast packet to use the service provided by the service providing unit 6. In this case, the packet processor 21 forwards the unicast packets to the internal network 5.

It is assumed, for example, the information processing device 11 sends the search command to retrieve the printer as the broadcast packet or the multicast packet. In such a case, the communication relay device 9 sends the packet to the internal network 5 so that the image forming device 4 connected to the internal network 5 may respond to the search command. The communication relay device 9 includes a packet determining unit 31, a packet transmitting unit 32 and a responding unit 33. In response to receiving the packet from the company network 10, the communication relay device 9 brings the packet determining unit 31 into operation at first.

The packet determining unit 31 determines if the packet received over the company network 10 is the packet to be discarded by the router functioning unit 20. The packet determining unit 31 may determine that the packet received over the company network 10 is the packet to be discarded by the router functioning unit 20. The packet determining unit 31 then further determines if the packet should be sent to the internal network 5. It is assumed, for example, the packet determining unit 31 receives the broadcast packet or the multicast packet to retrieve the printer. The packet determining unit 31 determines the received packet should be sent to the internal network 5. If the packet determining unit 31 determines that the packet received from the company network 10 is the packet to be discarded by the router functioning unit 20 and is the packet that should be sent to the internal network 5, the packet transmitting unit 32 is brought into operation next.

The packet transmitting unit 32 generates the new packet by copying the packet received by the communication relay device 9 from the company network 10. The packet transmitting unit 32 sets the IP address (AD3) of the port connected to the internal network 5 of the communication relay device 9 to the transmitter IP address of the new packet. The packet transmitting unit 32 then sends the new generated packet to the internal network 5.

Figure 3:
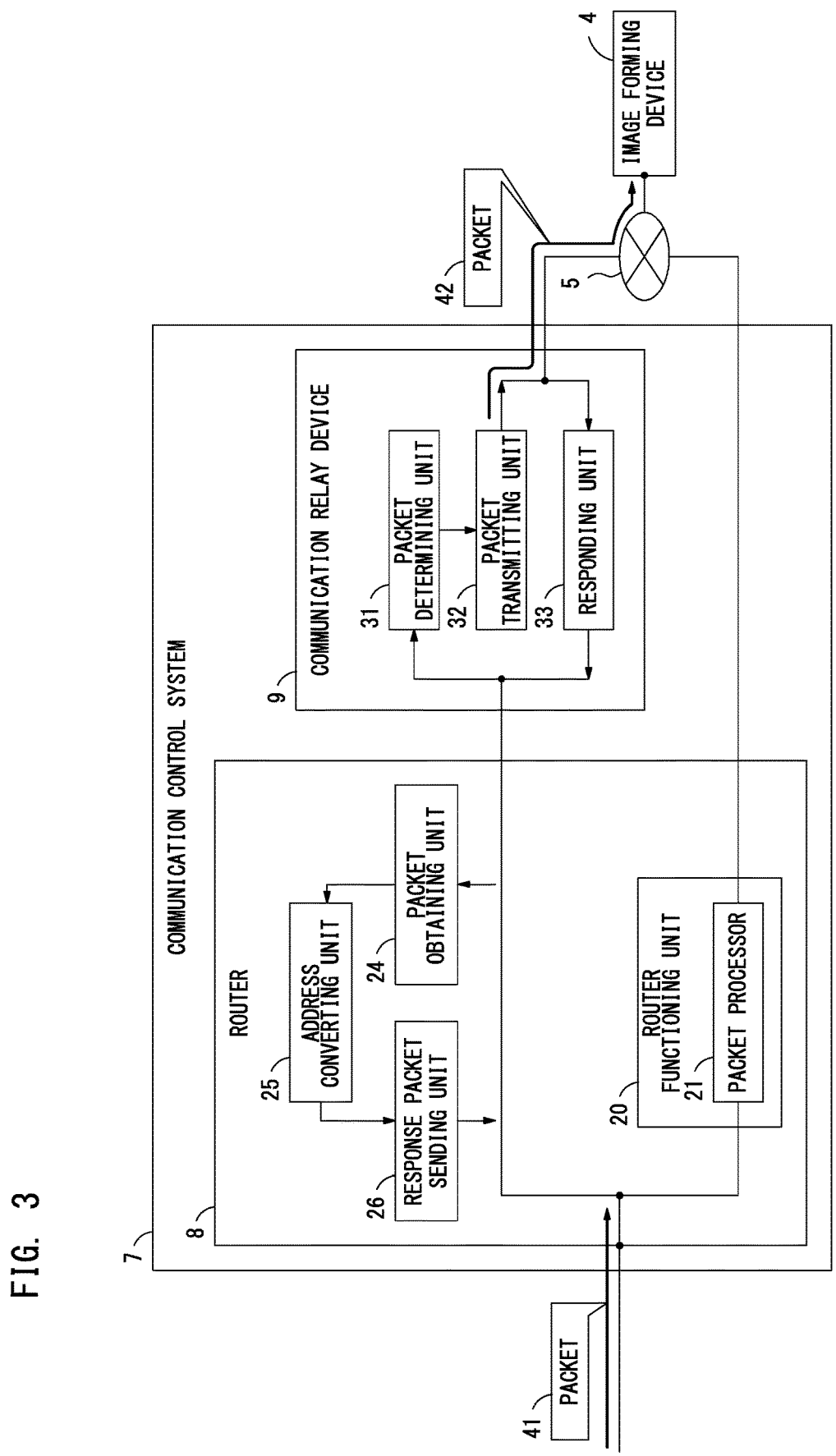
FIG. 3 illustrates an exemplary operation performed when the communication control system receives a packet for retrieving a printer from a company network.

FIG. 3 illustrates an exemplary operation performed when the communication control system 7 receives a packet 41 for retrieving the printer from the company network 10. The packet 41 may be the broadcast packet or the multicast packet sent from the information processing device 11, for instance. In response to receiving the packet 41 from the company network 10, the router functioning unit 20 discards the packet 41. The packet 41 is not transmitted to the internal network 5 via the router 8.

The communication relay device 9, on the other hand, also receives the same packet 41 as the packet 41 discarded by the router 8. When the packet 41 is received by the communication relay device 9, which is to be discarded by the router 8, a new packet 42 is generated by the packet transmitting unit 32 by copying the packet 41, and sent to the internal network 5. The packet 42 is sent to the internal network 5 as the broadcast packet or the multicast packet.

As described above, the packet transmitting unit 32 copies the packet 41 received from the company network 10 and generates the new packet 42. The packet transmitting unit 32 then sends the new generated packet 42 to the internal network 5 so that TTL (Time To Live) may be initialized. It is assumed, for example, the communication may be performed via the multiple hosts between the communication relay device 7 and the image forming device 4. Even in such a case, it may prevent the TTL of the new packet 42 from being 0 in the middle of the transmission. More specifically, this may realize the deliver of the new packet 42 to the image forming device 4 without fail.

Once receiving the packet 42 from the communication relay device 9, the image forming device 4 determines if the response to the packet 42 is necessary. When the received packet 42 includes the retrieval command to retrieve the printer, the image forming device 4 generates the response packet and transmits the generated packet to the communication relay device 9. The unicast packet specifying the communication relay device 9 as the destination is transmitted as the response packet.

Figure 4:
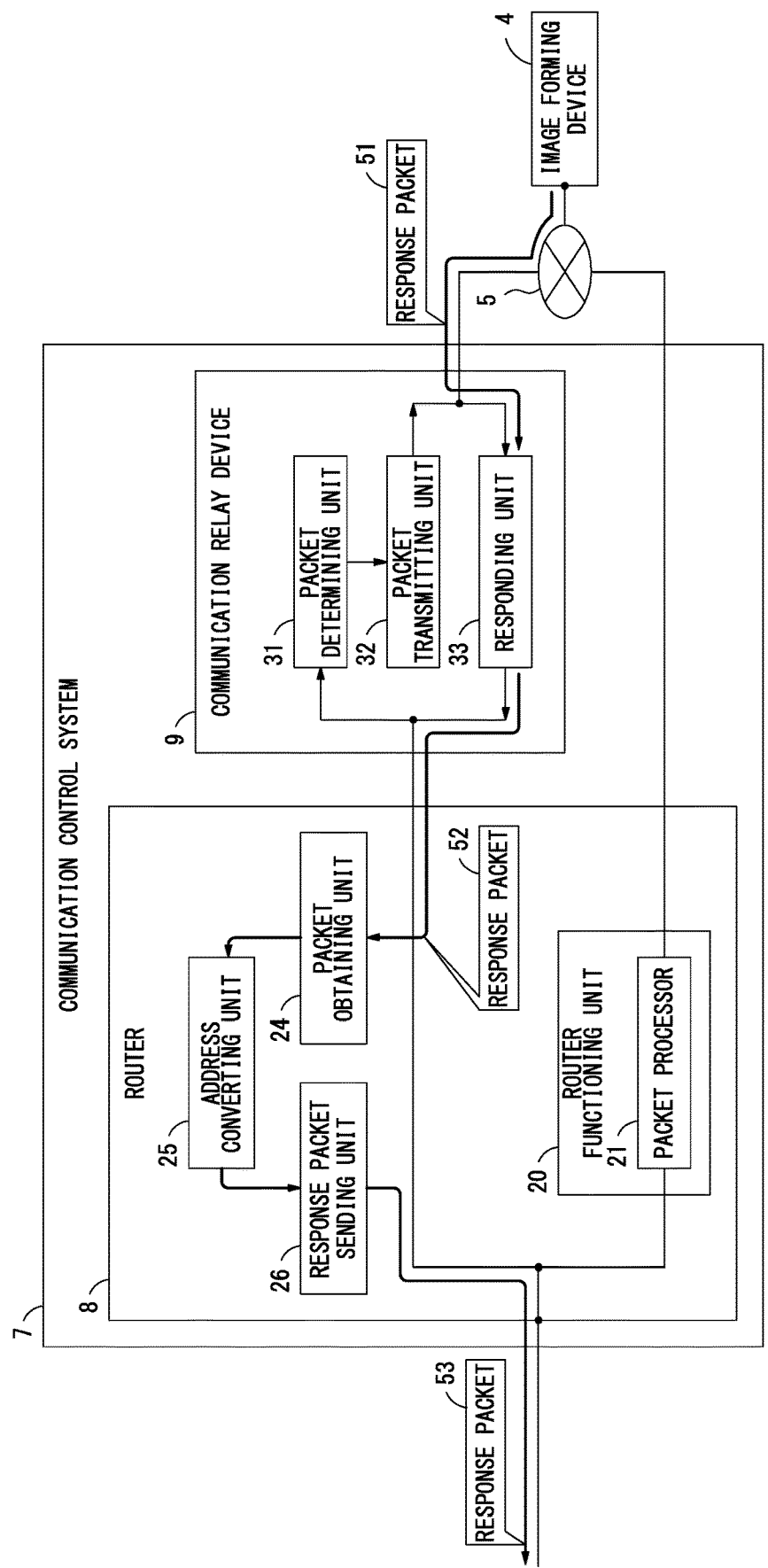
FIG. 4 illustrates an exemplary concept of a process of a response packet in the communication control system.

FIG. 4 illustrates an exemplary concept of a process of the response packet in the communication control system 7. Once receiving a response packet 51 from the image forming device 4, the communication relay device 9 brings the responding unit 33 into operation. The responding unit 33 copies the response packet 51 received from the image forming device 4, and generates a new response packet 52. The responding unit 33 sets the IP address of the information processing device 11 as the destination IP address of the response packet 52. The responding unit 33 also sets the IP address (AD2) of the communication relay device 9 as the destination IP address of the response packet 52. The responding unit 33 then sends the response packet 52 to the company network 10.

The response packet 52 sent from the communication relay device 9 passes through the router 8. The router 8 always monitors the packet sent from the communication relay device 9 to the company network 10. When detecting the response packet 52 sent from the communication relay device 9, the router 8 brings the packet obtaining unit 24, the address converting unit 25 and the response packet sending unit 26 one after another.

The packet obtaining unit 24 obtains the response packet 52 from the transmission line prior to the transmission of the response packet 52 from the communication relay device 9 to the company network 10. The response packet 52 sent from the communication relay device 9 is collected inside the router 8, and is never delivered to the company network 10. The packet obtaining unit 24 outputs the response packet 52 obtained from the transmission line to the address converting unit 25.

The address converting unit 25 generates a response packet 53. The transmitter IP address of the response packet 52 obtained by the packet obtaining unit 24 is converted into the IP address (AD1) of the router 8 (strictly being the router functioning unit 20), and is set to the response packet 53. The address converting unit 25 outputs the response packet 53 which has the rewritten transmitter address to the response packet sending unit 26. The response packet sending unit 26 sends the response packet 53 which has the transmitter address rewritten by the address converting unit 25 to the company network 10.

As described above, when the information processing device 11 receives the response packet 53 sent from the communication control system 7 to the company network 10, the IP address (AD1) of the router 8 is set as the transmitter address of the response packet 53. The information processing device 11 then recognizes the response packet 53 to the retrieve command is obtained from the IP address (AD1) of the router 8. The information processing device 11 then registers the IP address (AD1) of the router 8 as the IP address used for transmission of the print job to the image forming device 4. As a result, the user of the information processing device 11 may manage the IP address for the use of the service provided by the service providing unit 6 and the IP address for the use of the print function as the same address, resulting in improved convenience.

Figure 5:
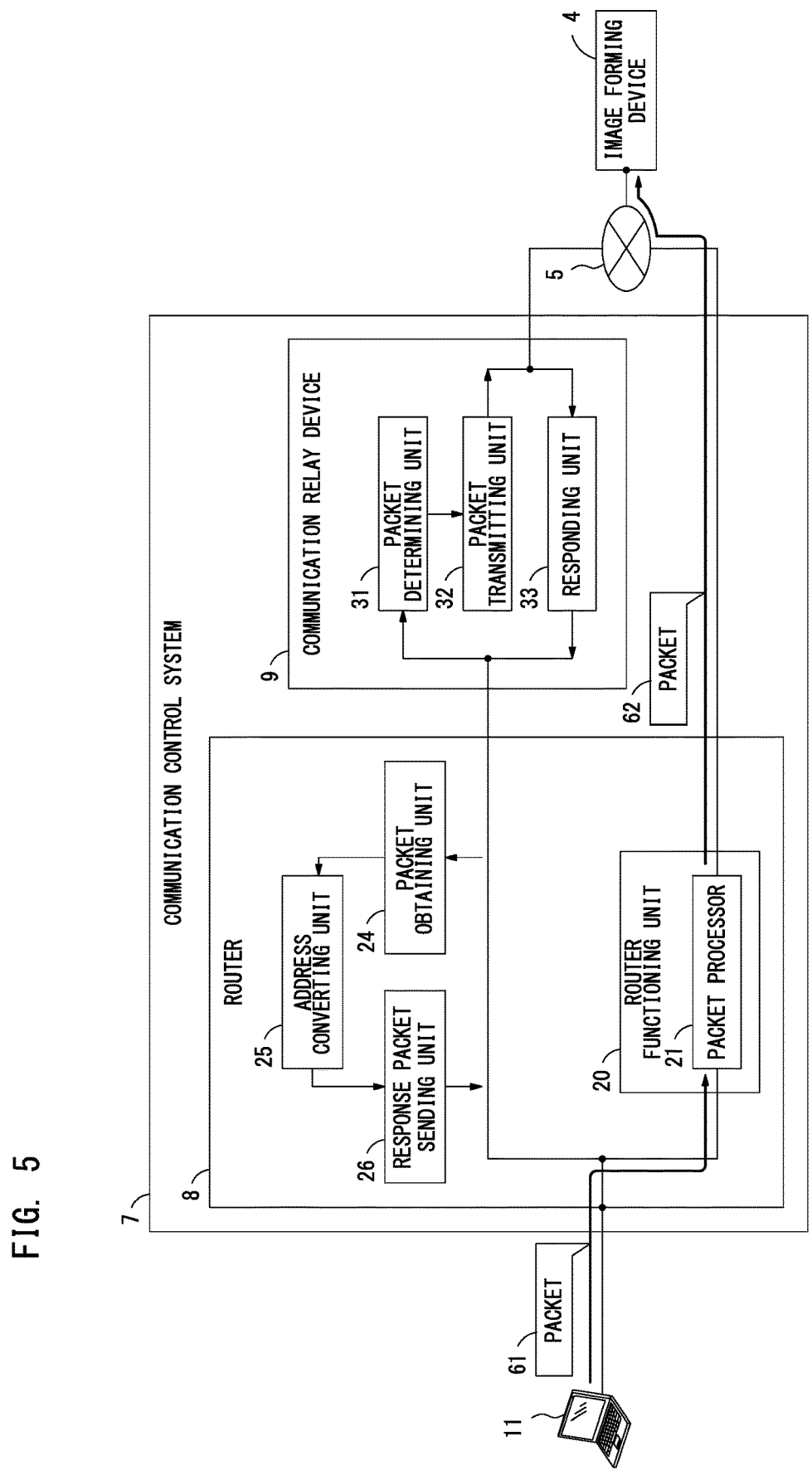
FIG. 5 illustrates an exemplary operation performed when the communication control system receives a packet for printing from the company network.

FIG. 5 illustrates an exemplary operation performed when the communication control system 7 receives a packet 61 for printing from the company network 10. When transmitting the print job to the image forming device 4, the information processing device 11 generates the packet 61 for printing specifying the port number 9100, for instance, and performs unicast to transmit the packet 61 to the IP address (AD1) of the router 8. The packet 61 for printing is processed by the router 8 of the communication control system 7. To be more specific, once the router functioning unit 20 receives the packet 61 for printing, the packet processor 21 is brought into operation. The packet processor 21 identifies the IP address (AD4) of the image forming device 4 associated in advance with the port number 9100. The packet processor 21 generates a packet 62 which has the destination address rewritten to the IP address (AD4) of the image forming device 4, and sends the packet 62 to the internal network 5. As a result, the image forming device 4 may receive the print job addressed to itself. If the print job is received via the router 8, the image forming device 4 produces a printed output based on the print job.

Figure 6:
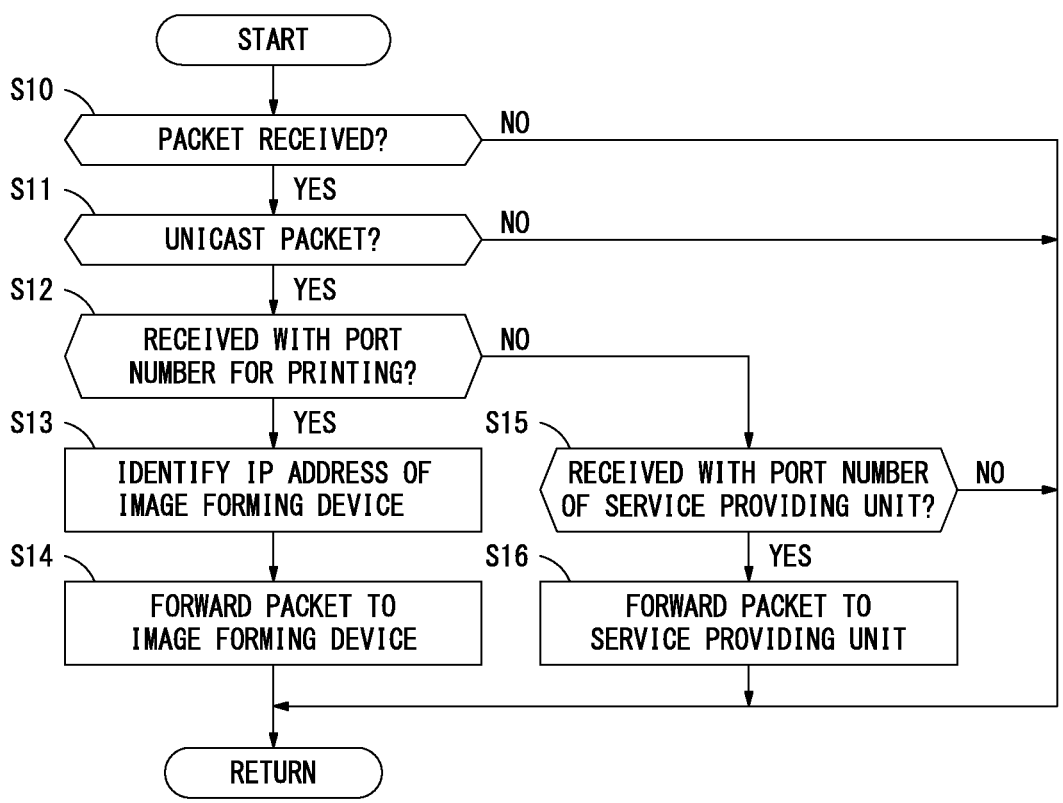
FIG. 6 illustrates a flow diagram explaining an exemplary procedure of a process performed by a router functioning unit of a router.

A process sequence performed in the communication control system 7 is explained next. FIG. 6 illustrates a flow diagram explaining an exemplary procedure of a process performed by the router functioning unit 20 of the router 8. This process is performed when the hardware processor of the server 3 executes a predetermined program, for example. When the router functioning unit 20 starts the process, it determines if the packet is received from the company network 10 (step S10). The packet may not be received from the company network 10 (when a result of step S10 is NO). The process is then complete. The packet may be received from the company network 10 (when a result of step S10 is YES). In such a case, the router functioning unit 20 determines whether the received packet is the unicast packet specifying the router 8 as the destination (step S11). If the received packet is not the unicast packet specifying the router 8 as the destination (when a result of step S11 is NO), the router functioning unit 20 discards the received packet and completes the process. Hence, if the retrieval command for retrieving the printer is broadcasted or transmitted by multicast from the information processing device 11, the received packet is discarded by the router functioning unit 20.

When the packet received from the company network 10 is the unicast packet specifying the router 8 as the destination (when a result of step S11 is YES), the router functioning unit 20 determines if the packet is received with the port number 9100 for printing (step S12). The packet may be received with the port number 9100 for printing (when a result of step S12 is YES). The router functioning unit 20 then identifies the IP address (AD4) of the image forming device 4 connected to the internal network 5 (step S13), and forwards the packet to the IP address (step S14).

The packet may not be received with the port number 9100 for printing (when a result of step S12 is NO). The router functioning unit 20 determines if the packet is received with the port number supported by the service providing unit 6 (step S15). If the unicast packet is received with the port number supported by the service providing unit 6 (when a result of step S15 is YES), the router functioning unit 20 forwards the packet to the service providing unit 6 (step S16). If the packet is received with the port number not supported by the service providing unit 6 (when a result of step S15 is NO), the router functioning unit 20 discards the received packet and completes the process. The router functioning unit 20 repeatedly performs the above-described process.

Figure 7:
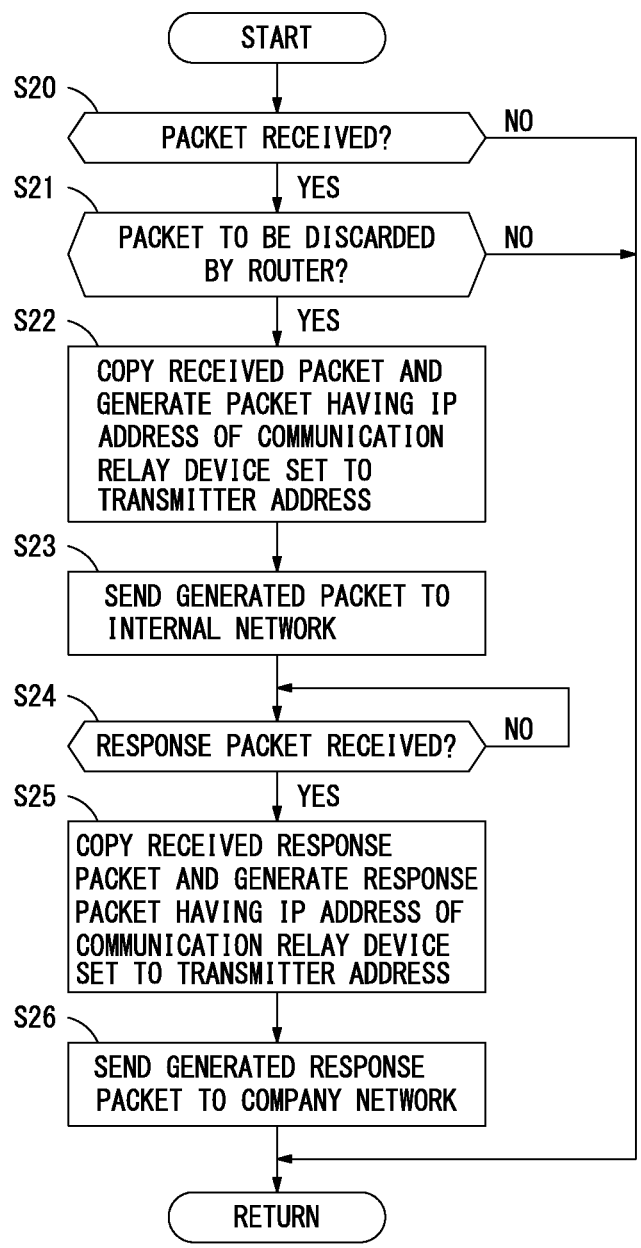
FIG. 7 illustrates a flow diagram explaining an exemplary procedure of a process performed by a communication relay device.

FIG. 7 illustrates a flow diagram explaining an exemplary procedure of a process performed by the communication relay device 9. As the same as above-described process, this process is also performed when the hardware processor of the server 3 executes the predetermined program, for example. When the communication relay device 9 starts the process, it determines if the packet is received from the company network 10 (step S20). The packet may not be received from the company network 10 (when a result of step S20 is NO). The process is then complete. The packet may be received from the company network 10 (when a result of step S20 is YES). In such a case, the communication relay device 9 determines whether the received packet is the packet to be discarded by the router 8 (step S21). The received packet may be the broadcast packet or the multicast packet and it includes the retrieval command for retrieving the printer, the communication relay device 9 determines the received packet is the packet to be discarded by the router 8. When the communication relay device 9 determines the received packet is not the packet to be discarded by the router 8 (when a result of step S21 is NO), the process is complete.

When the communication relay device 9 determines the received packet is the packet to be discarded by the router 8 (when a result of step S21 is YES), the communication relay device 9 copies the packet received from the company network 10, and generates the new packet to which the IP address (AD3) of the communication relay device 9 is set to the transmitter IP address (step S22). The communication relay device 9 then sends the generated packet to the internal network 5 (step S23). The communication relay device 9 waits until receiving the response packet from the image forming device 4 (step S24). In response to receiving the response packet from the image forming device 4 (when a result of step S24 is YES), the communication relay device 9 copies the response packet received from the image forming device 4, and generates the response packet which has the IP address (AD2) of the communication relay device 9 set to the transmitter IP address (step S25). The communication relay device 9 then sends the generated response packet to the company network 10 (step S26). The communication relay device 9 repeatedly performs the above-described process.

Figure 8:
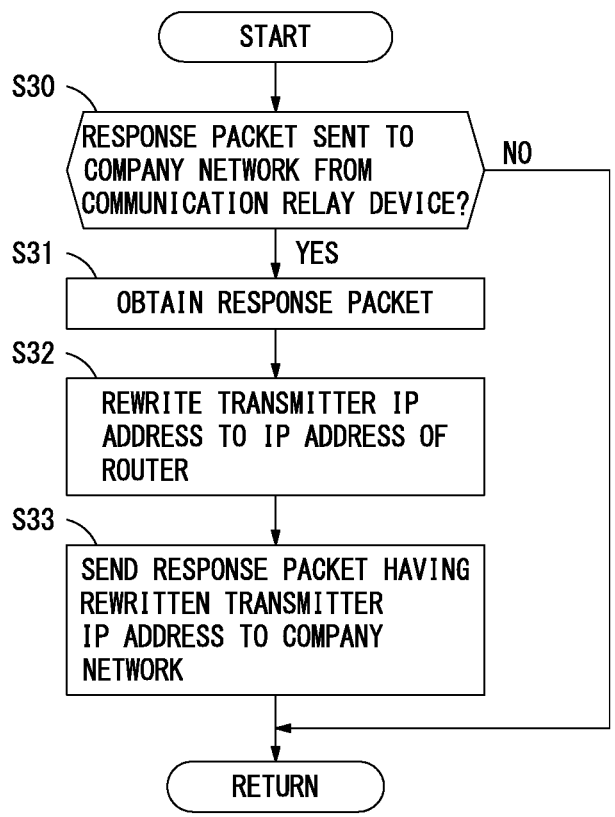
FIG. 8 illustrates a flow diagram explaining an exemplary procedure of a process performed by a packet obtaining unit, an address converting unit and a response packet transmitting unit of the router.

FIG. 8 illustrates a flow diagram explaining an exemplary procedure of a process performed by the packet obtaining unit 24, the address converting unit 25 and the response packet sending unit 26 of the router 8. As the same as above-described process, this process is also performed when the hardware processor of the server 3 executes the predetermined program, for example. When the router 8 starts the process, it determines if the packet is sent from the communication relay device 9 to the company network 10 (step S30). The packet may not be sent from the communication relay device 9 (when a result of step S30 is NO). The process is then complete. The packet may be sent from the communication relay device 9 (when a result of step S30 is YES). In such a case, the router 8 brings the packet obtaining unit 24 into operation to obtain the response packet from the transmission line (step S31). The router 8 then brings the address converting unit 25 into operation to rewrite the transmitter IP address set to the response packet obtained by the packet obtaining unit 24 to the IP address (AD1) of the router 8 (step S32). The router 8 brings the response packet sending unit 26 into operation to send the response packet to which the rewritten transmitter IP address is set to the company network 10 (step S33). The router 8 repeatedly performs the above-described process so that it may transmit the response packet which has the transmitter IP address rewritten to the IP address of the router 8 to the company network 10 when the response packet is sent from the communication relay device 9 to the company network 10.

As described above, the communication system 7 of the first preferred embodiment includes the router 8 and the communication relay device 9 each of which is connected between the company network 10 and the internal network 5. The router 8 bridge-connects the communication relay device 9 and the company network 10. When the first packet is received from the company network 10, the communication relay device 9 determines if the received first packet is to be discarded by the router 8. When determining that the received first packet is the packet to be discarded by the router 8, the communication relay device 9 generates the second packet corresponding to the first packet and sends the generated second packet to the internal network 5. Even when the retrieval command to retrieve the printer is sent as the broadcast packet or the multicast packet from the information processing device 11 connected to the company network 10, the retrieval command may be delivered to the image forming device 4 connected to the internal network 5.

In the communication system 7 of the first preferred embodiment, once the response packet is sent from the communication relay device 9 to the company network 10, the router 8 obtains the response packet. The router 8 obtains the response packet prior to the transmission of the response packet from the communication relay device 9 to the company network 10. The router 8 rewrites the transmitter IP address of the response packet to the IP address of the router 8, and sends the response packet.

The above-described communication system 7 does not require an installation of a probe device on the internal network 5 as a conventional manner. The IP address of the probe device is not necessary to be registered in advance with the information processing device 11, resulting in excellent convenience.

In the communication system 7 of the first preferred embodiment, when the retrieval command to retrieve the printer is sent as the broadcast packet or the multicast packet by the information processing device 11, the response packet to the retrieval command may be automatically obtained. The IP address of the router 8 is set to the transmitter IP address of the response packet. The information processing device 11 then may automatically register the IP address of the router 8 as the destination IP address for transmitting the print job to the image forming device 4. As a result, the information processing device 11 may manage the IP address used to access the image processing unit 2 to use the service provided by the service providing unit 6 and the IP address used to access the image processing unit 2 to use the print function as the same address.

The router 8 may receive the unicast packet specifying the specific port number from the company network 10. In such a case, the router 8 forwards the unicast packet to the IP address of the internal network 5 corresponding to the specific port number. When using the service provided by the service providing unit 6, the information processing device 11 may transmit the unicast packet specifying the port number supported by the service providing unit 6 to the router 8. When using the print function of the image processing unit 2, the information processing device 11 may transmit the unicast packet specifying the port number for printing to the router 8.

As described above, the information processing device may obtain the response packet in reply to the packet broadcasted or transmitted by multicast from the information processing device without any advance setting with the printer driver of the information processing device. Especially, the response packet obtained by the information processing device may be made to look like it has been the packet sent by the router.

Second Preferred Embodiment

The second preferred embodiment of the present invention is explained next. In the above-described first preferred embodiment, once the response packet is sent by the communication relay device 9, the router 8 obtains the response packet. The router 8 rewrites the transmitter IP address of the response packet to the IP address of the router 8, and sends the response packet to the company network 10. In the second preferred embodiment, when the communication relay device 9 sends the response packet to the company network 10, it rewrites the transmitter IP address of the response packet to the IP address of the router 8. The structure of the overall network system 1 of the second preferred embodiment is the same as that illustrated in FIG. 1.

Figure 9:
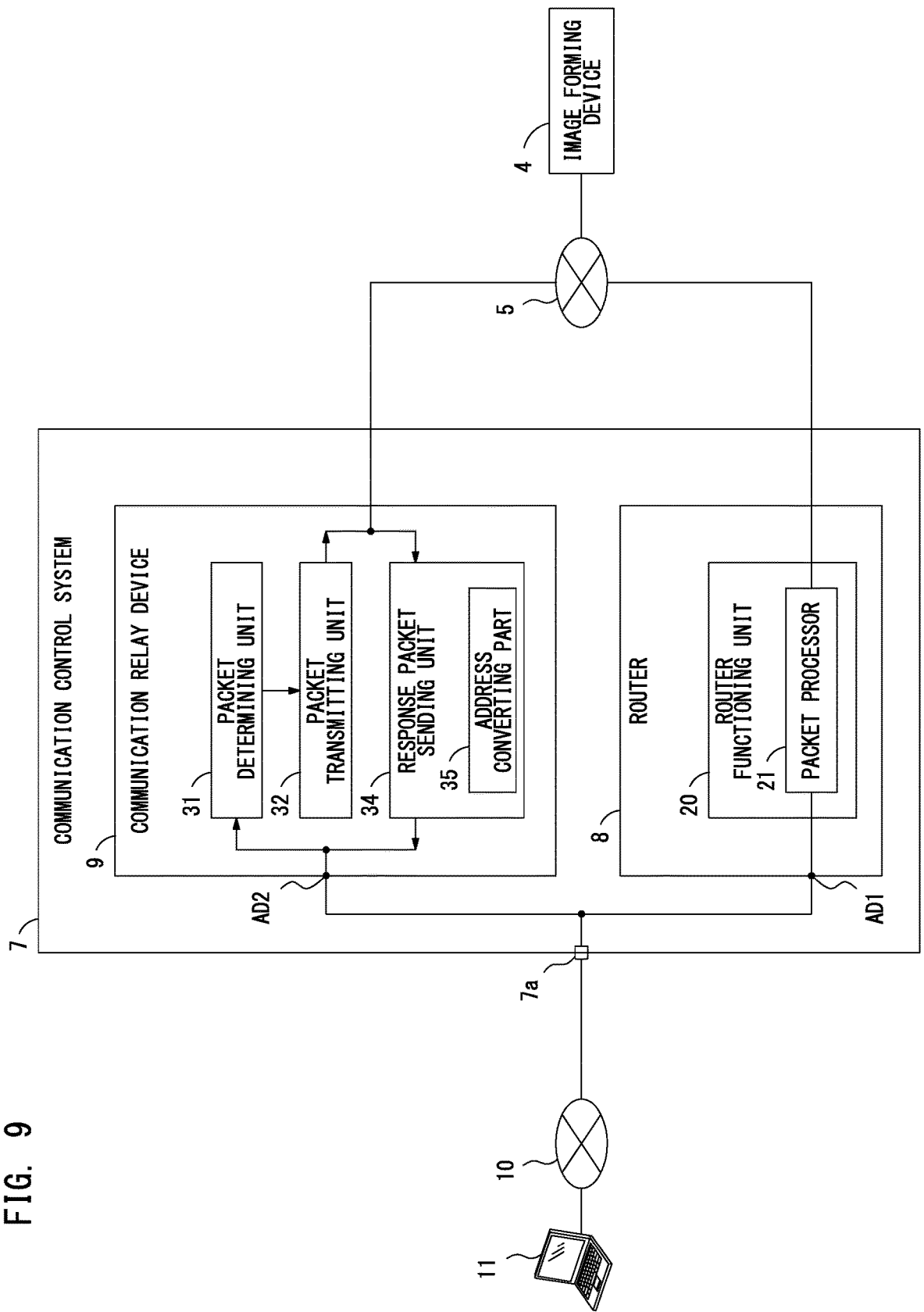
FIG. 9 illustrates a block diagram showing an example of the detailed functional structure of the communication control system in which a second preferred embodiment may be practiced.

FIG. 9 illustrates a block diagram showing an example of the detailed functional structure of the communication control system 7 in which the second preferred embodiment may be practiced. As illustrated in FIG. 9, the communication control system 7 includes the router 8 and the communication relay device 9 connected in parallel between the company network 10 and the internal network 5. To be more specific, one side of the port of the router 8 is connected to the network port 7*a* connected to the company network 10, and another side of the port is connected to the internal network 5 in the communication control system 7. In the similar way, one side of the port of the communication relay device 9 is connected to the network port 7*a*, and another side of the port is connected to the internal network 5 in the communication control system 7. Hence, the packet sent from the information processing device 11 to the company network 10 may be received by both of the router 8 and the communication relay device 9 in the communication control system 7.

The router 8 includes the router functioning unit 20, which is explained in the first preferred embodiment. When the router 8 receives the retrieval command to retrieve the printer sent as the broadcast packet or the multicast packet from the company network 10, the router 8 discards the packet. When receiving the unicast packet specifying the specific port number, the router 8 forwards the received packet to the internal network 5, which is explained in the first preferred embodiment.

The communication relay device 9 includes the packet determining unit 31, the packet transmitting unit 32 and a response packet sending unit 34. The packet determining unit 31 and the packet transmitting unit 32 are the same as those explained in the first preferred embodiment. To be more specific, in response to receiving the packet from the company network 10, the packet determining unit 31 determines if the packet received from the company network 10 is the packet to be discarded by the router 8. The packet determining unit 31 may determine that the packet received from the company network 10 is the packet to be discarded by the router 8. The packet transmitting unit 32 then generates the new packet by copying the received packet, and sends the new generated packet to the internal network 5. As a result the retrieval command broadcasted or transmitted by multicast from the company network 10 from the information processing device 11 may be delivered to the image forming device 4. The image forming device 4 then generates the response packet to the retrieval command and sends the response packet to the communication relay device 9 over the internal network 5.

In response to receiving the response packet from the image forming device 4, the response packet sending unit 34 performs a process to the response packet. The response packet sending unit 34 copies the response packet received from the image forming device 4 and generates the new response packet to send to the company network 10. The response packet sending unit 34 includes an address converting part 35. Once the new response packet to send to the company network 10 is generated by the response packet sending unit 34, the address converting part 35 rewrites the transmitter IP address set to the response packet to the IP address (AD1) of the router 8. To be more specific, when generating the new response packet to send to the company network 10 based on the response packet received from the image forming device 4, the response packet sending unit 34 sets the IP address (AD1) of the router 8 not the IP address (AD2) of the communication relay device 9 to the transmitter IP address of the new response packet. The response packet sending unit 34 sends the response packet to which the IP address (AD1) of the router 8 is set as the transmitter IP address to the company network 10.

In the second preferred embodiment, the response packet sent from the communication relay device 9 to the company network 10 does not pass through the router 8. The response packet is directly transmitted to the company network 10. The information processing device 11 directly receives the response packet from the communication relay device 9. In response to receiving the response packet, the information processing device 11 registers the IP address used for transmission of the print job based on the transmitter IP address of the response packet. The information processing device 11 registers the IP address of the router 8 as the destination of the print job. The IP address of the communication relay device 9 is not registered as the destination of the print job. The user of the information processing device 11 of the second preferred embodiment may also manage the IP address used for the use of the service provided by the service providing unit 6 and the IP address used for the use of the print function as the same address, resulting in improved convenience.

Figure 10:
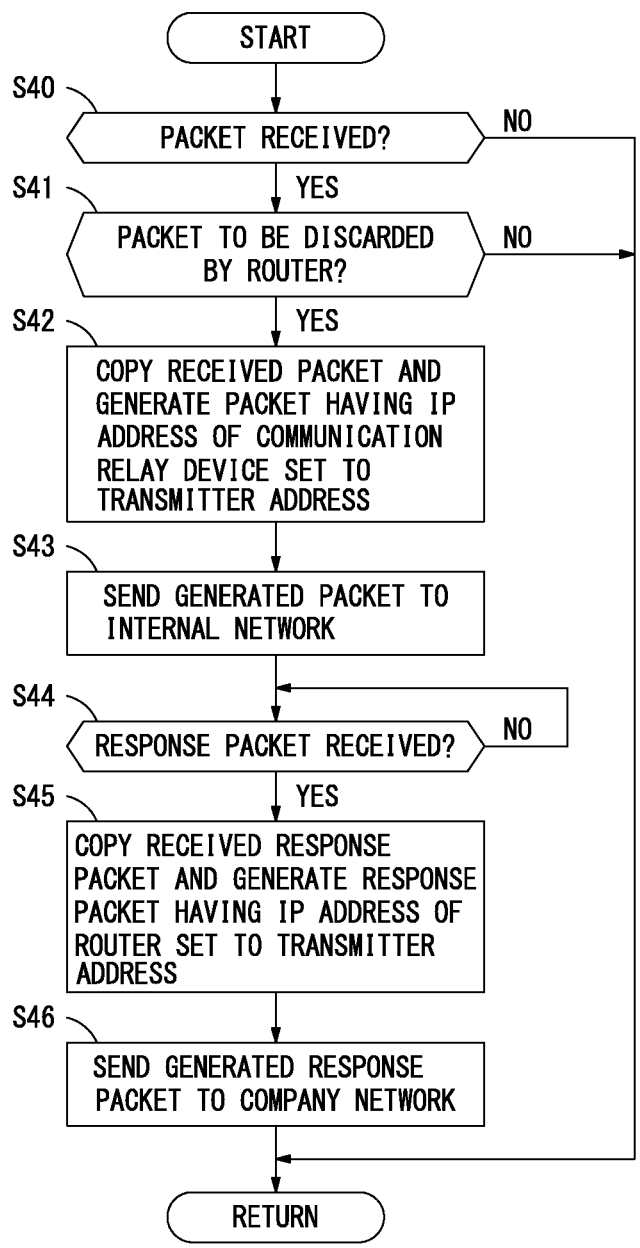
FIG. 10 illustrates a flow diagram explaining an exemplary procedure of a process performed by the communication relay device in which the second preferred embodiment may be practiced.

FIG. 10 illustrates a flow diagram explaining an exemplary procedure of a process performed by the communication relay device 9 in which the second preferred embodiment may be practiced. As the same as above-described process explained in the first preferred embodiment, this process is also performed when the hardware processor of the server 3 executes the predetermined program, for example. The process in steps S40 to S44 of the flow diagram illustrated in FIG. 10 is the same as that in steps S20 to S24 of the flow diagram illustrated in FIG. 7. The communication relay device 9 may receive the response packet from the image forming device 4 (when a result of step S44 is YES). In such a case, the communication relay device 9 copies the received response packet, and generates the new response packet to which the IP address (AD1) of the router 8 is set to the transmitter IP address (step S45). The communication relay device 9 then sends the response packet generated in step S45 to the company network 10 (step S46).

As described above, the communication control system 7 of the second preferred embodiment includes the router 8 and the communication relay device 9 connected to each other in parallel between the company network 10 and the internal network 5. When the first packet is received from the company network 10, the communication relay device 9 determines if the received first packet is to be discarded by the router 8, which is the same as what described in the first preferred embodiment. When determining that the received first packet is the packet to be discarded by the router 8, the communication relay device 9 generates the second packet corresponding to the first packet and sends the generated second packet to the internal network 5. In response to receiving the response packet over the internal network 5, the communication relay device 9 rewrites the transmitter IP address of the response packet to the IP address of the router 8, and sends the response packet to the company network 10. To be more specific, in the communication control system 7 of the second preferred embodiment, when the packet broadcasted or transmitted by multicast to retrieve the printer is received from the information processing device 11, the communication relay device 9 is enabled to perform both processes, the one to enable the image forming device 4 to respond to the received packet and the one to rewrite the transmitter IP address of the response packet received from the image forming device 4 to the IP address of the router 8. Even with this structure, the same working effect as described in the first preferred embodiment may be obtained. Except from the above-described points are the same as those described in the first preferred embodiment.

Although the embodiment of the present invention has been described and illustrated in detail, it is clearly understood that the same is by way of illustration and example only and not limitation, the scope of the present invention should be interpreted by terms of the appended claims.

MODIFICATIONS

While the preferred embodiments of the present invention have been described above, the present invention is not limited to the preferred embodiments. Various modifications may be applied to the present invention.

In the above-described first and second preferred embodiments, for example, the single image forming device 4 is connected to the internal network 5 of the image processing unit 2. However, this is given not for limitation. In addition to the image forming device 4 installed inside the image processing unit 2, an external image forming device, for instance, may also be connected to the internal network 5. The number of the external image forming device connected to the internal network 5 does not have to be one. More than two external image forming devices may be connected to the internal network 5. Even in such a case, the information processing device 11 broadcasts or transmits by multicast the retrieval command to retrieve the printer, thereby obtaining the response packet from each of the multiple image forming devices connected to the internal network 5.

The server 3 executes the predetermined program so that each of the router 8 and the communication relay device 9 of the first and the second preferred embodiments is brought into operation. The program to serve as the router 8 and the program to serve as the communication relay device 9 may be constructed as the single program which is executed by the server 3. Alternatively, the program may be constructed as the separate respective program. Also, the program may be provided to the server 3 over an internet, for instance, or via the computer readable recording medium such as a CD-ROM or DVD-ROM.

Each of the above-described router 8 and communication relay device 9 is not necessary to be served on the single server. The router 8 and the communication relay device 9 may be constructed by a respective separate independent hardware.

In the above-described first and second preferred embodiments, the single server 3 includes two functions of the service providing unit 6 and the communication control system 7. However, this is given not for limitation. The service providing unit 6 and the communication control system 7 may be served on the respective different server.

The number of the hardware processor of the server 3 does not have to be one, and it may be more than one.

What is claimed is:

1. A communication control system comprises:
   a router that connects a first network and a second network;
   a communication relay device that connects said first network and said second network; and
   a hardware processor that:
   determines whether a first packet received from said first network is a packet to be discarded by said router;
   transmits a second packet corresponding to said first packet to said second network in response to said first packet being determined as the packet to be discarded by said router; and
   rewrites a transmitter IP address of a response packet corresponding to said second packet to an IP address of said router and sends the response packet to said first network in response to the response packet being received from said second network.

2. The communication control system according to claim 1, wherein
   said hardware processor enables said router to obtain the response packet sent from said communication relay device to said first network prior to the transmission to said first network and rewrite the transmitter IP address of the response packet to the IP address of said router.

3. The communication control system according to claim 1, wherein
   said hardware processor enables said communication relay device to rewrite the transmitter IP address of the response packet corresponding to said second packet to the IP address of said router and send the response packet to said first network.

4. The communication control system according to claim 1, wherein
   said hardware processor determines said first packet as the packet to be discarded by said router when said first packet is a broadcast packet or a multicast packet.

5. The communication control system according to claim 1, wherein
   an image forming device capable of producing printed outputs is connected to said second network, and
   said hardware processor determines said first packet as the packet to be discarded by said router when said first packet is the packet to retrieve said image forming device.

6. The communication control system according to claim 1, wherein
   said router forwards a unicast packet specifying a specific port number to the IP address of said second network corresponding to the specific port number when the unicast packet is received from said first network.

7. The communication control system according to claim 1, wherein
   said router and said communication relay device are incorporated in a single housing,
   said housing is provided with a network port to which a cable connected to said first network is connected, and
   said network port is connected to each of said router and said communication relay device in said housing.

8. An image processing unit having a single housing, wherein
said single housing includes:
a communication control system according to claim 1;
a second network; and
an image forming device connected to said second network and being capable of producing printed outputs.

9. A non-transitory recording medium storing a computer readable program to be executed by a computer connecting a first network and a second network, wherein execution of the computer readable program by said computer causing said computer to serve as:
a router that connects a first network and a second network; and
a communication relay device that connects said first network and said second network, execution of the computer readable program by said computer causing said computer to perform:
determining whether a first packet received from said first network is a packet to be discarded by said router;
transmitting a second packet corresponding to said first packet to said second network in response to said first packet being determined to be the packet discarded by said router; and
rewriting a transmitter IP address of a response packet corresponding to said second packet to an IP address of said router and sending the response packet to said first network in response to the response packet being received from said second network.

10. The non-transitory recording medium storing a computer readable program to be executed by a computer according to claim 9, execution of the computer readable program by said computer causing said computer to further perform:
said router is enabled to obtain the response packet sent from said communication relay device to said first network prior to the transmission to said first network and rewrite the transmitter IP address of the response packet to the IP address of said router.

11. The non-transitory recording medium storing a computer readable program to be executed by a computer according to claim 9, execution of the computer readable program by said computer causing said computer to further perform:
said communication relay device is enabled to rewrite the transmitter IP address of the response packet corresponding to said second packet to the IP address of said router and send the response packet to said first network.

12. The non-transitory recording medium storing a computer readable program to be executed by a computer according to claim 9, execution of the computer readable program by said computer causing said computer to further perform:
said first packet is determined as the packet to be discarded by said router when said first packet is a broadcast packet or a multicast packet.

13. The non-transitory recording medium storing a computer readable program to be executed by a computer according to claim 9, execution of the computer readable program by said computer causing said computer to further perform:
an image forming device capable of producing printed outputs is connected to said second network, and
said first packet is determined as the packet to be discarded by said router when said first packet is the packet to retrieve said image forming device.

14. The non-transitory recording medium storing a computer readable program to be executed by a computer according to claim 9, execution of the computer readable program by said computer causing said computer to further perform:
enabling said router to forward a unicast packet specifying a specific port number to the IP address of said second network corresponding to the specific port number when the unicast packet is received from said first network.

\* \* \* \* \*